US 12,248,342 B2

(12) United States Patent
Park et al.

(10) Patent No.: US 12,248,342 B2
(45) Date of Patent: Mar. 11, 2025

(54) SPEAKER MODULE AND ELECTRONIC DEVICE, INCLUDING THE SAME

(71) Applicant: Samsung Electronics Co., Ltd., Suwon-si (KR)

(72) Inventors: Jihoon Park, Suwon-si (KR); Hanbom Park, Suwon-si (KR); Byunggun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 17/888,817

(22) Filed: Aug. 16, 2022

(65) Prior Publication Data
US 2023/0057510 A1 Feb. 23, 2023

Related U.S. Application Data

(63) Continuation of application No. PCT/KR2022/012139, filed on Aug. 12, 2022.

(30) Foreign Application Priority Data

Aug. 17, 2021 (KR) .................... 10-2021-0108362

(51) Int. Cl.
*G06F 1/16* (2006.01)
*H04M 1/03* (2006.01)
(Continued)

(52) U.S. Cl.
CPC .......... *G06F 1/1688* (2013.01); *G06F 1/1616* (2013.01); *G06F 1/1652* (2013.01);
(Continued)

(58) Field of Classification Search
CPC .... H04M 1/035; G06F 1/1615; G06F 1/1616; G06F 1/1618; G06F 1/1652; G06F 1/1688; G06F 1/1681
See application file for complete search history.

(56) References Cited

U.S. PATENT DOCUMENTS

| 5,915,015 A | 6/1999 | Thornton |
| 10,928,860 B2 * | 2/2021 | Park ..................... G06F 1/1681 |

(Continued)

FOREIGN PATENT DOCUMENTS

| CN | 202514052 | 10/2012 |
| CN | 111770221 | 10/2020 |

(Continued)

OTHER PUBLICATIONS

Search Report and Written Opinion dated Nov. 22, 2022 issued in International Patent Application No. PCT/KR2022/012139.

(Continued)

*Primary Examiner* — Nidhi Thaker
(74) *Attorney, Agent, or Firm* — Nixon & Vanderhye P.C.

(57) ABSTRACT

An electronic device according to various embodiments of the disclosure includes: a first housing; a second housing configured to be unfolded by a specified angle with respect to the first housing and to rotate about a folding axis; at least one hinge structure including a hinge providing the folding axis and disposed between the first housing and the second housing to rotatably connect the first housing and the second housing; a hinge cover accommodating at least a portion of the hinge structure therein and selectively exposed based on the rotation of the second housing; a first speaker module including a speaker accommodated in the first housing; and a second speaker module including a speaker accommodated in the second housing, wherein in the first state, the first speaker module is configured to discharge sound to the outside of the electronic device via a first area provided in the first housing, a second area provided in the hinge structure and contact with the first area, and a first through-hole extending through the hinge cover, is exposed to the outside in the first state, and is configured to be selectively closed based on the rotation of the second housing.

20 Claims, 16 Drawing Sheets

(51) Int. Cl.
*H04R 1/28* (2006.01)
*H04R 1/32* (2006.01)

(52) U.S. Cl.
CPC .......... *G06F 1/1681* (2013.01); *H04M 1/035* (2013.01); *G06F 1/1615* (2013.01); *H04R 1/2857* (2013.01); *H04R 1/323* (2013.01)

(56) References Cited

U.S. PATENT DOCUMENTS

| | | | |
|---|---|---|---|
| 11,399,086 B2* | 7/2022 | Jung | .................... H04R 1/2811 |
| 2009/0088222 A1 | 4/2009 | Numano et al. | |
| 2009/0149225 A1 | 6/2009 | Yokota et al. | |
| 2017/0094380 A1 | 3/2017 | Rittenhouse | |
| 2018/0109871 A1* | 4/2018 | Huh | ...................... G06F 1/1652 |
| 2018/0279029 A1 | 9/2018 | Saini et al. | |
| 2020/0382627 A1 | 12/2020 | Park et al. | |
| 2023/0152848 A1* | 5/2023 | Yu | ......................... H04M 1/035 |
| | | | 361/679.55 |
| 2023/0291819 A1* | 9/2023 | Jeon | ....................... H04R 1/025 |

FOREIGN PATENT DOCUMENTS

| | | | | |
|---|---|---|---|---|
| CN | 112261180 | | 1/2021 | |
| CN | 112261180 A | * | 1/2021 | .......... H04M 1/0216 |
| CN | 114629977 | | 6/2022 | |
| CN | 115379030 | | 11/2022 | |
| JP | 2005-151319 | | 6/2005 | |
| JP | 2005-328284 | | 11/2005 | |
| JP | 2012-034125 | | 2/2012 | |
| JP | 2013-021470 | | 1/2013 | |
| KR | 10-0447542 | | 9/2004 | |
| KR | 10-2018-0040797 | | 4/2018 | |
| KR | 10-2018-0048633 | | 5/2018 | |
| KR | 10-2019-0127868 | | 11/2019 | |
| KR | 10-2020-0132016 | | 11/2020 | |
| KR | 10-2020-0137948 | | 12/2020 | |
| KR | 10-2020-0139629 | | 12/2020 | |
| KR | 10-2021-0099974 | | 8/2021 | |
| WO | 2006/068122 | | 6/2006 | |
| WO | WO-2021157891 A1 | * | 8/2021 | |

OTHER PUBLICATIONS

Partial Supplemental EP Search Report dated Oct. 7, 2024 for EP Application No. 22858691.3.
Extended European Search Report dated Jan. 9, 2025 for EP Application No. 22858691.3.

* cited by examiner (a)

(b)

(a)

(b)

(a)

(b)

SPEAKER MODULE AND ELECTRONIC DEVICE, INCLUDING THE SAME

CROSS-REFERENCE TO RELATED APPLICATIONS

This application is a continuation of International Application No. PCT/KR2022/012139 designating the United States, filed on Aug. 12, 2022, in the Korean Intellectual Property Receiving Office and claiming priority to Korean Patent Application No. 10-2021-0108362, filed on Aug. 17, 2021, in the Korean Intellectual Property Office, the disclosures of which are incorporated by reference herein in their entireties.

BACKGROUND

Field

The disclosure relates to a speaker module and an electronic device including the same.

Description of Related Art

In line with remarkable development of information/communication technologies, semiconductor technologies, and the like, there has been widespread use of various kinds of electronic devices. Particularly, recent electronic devices have been developed to be carried and used for communication.

Electronic devices may refer to device configured to perform specific functions according to installed programs, such as home appliances, electronic wallets, portable multimedia players, mobile communication terminals, tablet PCs, video/audio devices, desktop/laptop computers, and vehicle navigation systems. For example, electronic devices may output stored information as sounds or images. In line with the high degree of integration of electronic devices and the widespread use of super-fast large-capacity wireless communication, it has recently become possible to equip a single electronic device (for example, mobile communication terminal) with various functions. For example, not only a communication function, but also an entertainment function (for example, gaming), a multimedia function (for example, music/video playback), communication and security functions for mobile banking and the like, a scheduling function, and an electronic wallet function may be integrated into a single electronic device. Such electronic devices have become compact such that users can conveniently carry the same.

As mobile communication services have been extended to multimedia service areas, electronic devices may have larger display sizes such that users can sufficiently use not only voice communication and short messages, but also multimedia services. Accordingly, a folding-enabled flexible display may be disposed in the entire area of a housing structure that is separated to enable folding.

Stereo sound effect may give a stereoscopic impression during sound listening by increasing the sound volume and distinguishing the left and right of sound sources, thereby improving the sound quality and performance.

A mobile electronic device may include a total of two speakers, each on either end (for example, upper/lower end) of the electronic device, to implement the stereo sound effect. A foldable mobile device may also include a total of two speakers, on the upper and lower ends, respectively. When music is played during un-folding of the foldable mobile device, sounds are output through both upper and lower speakers, but during folding, the upper speaker is moved and positioned adjacent to the lower speaker, and the upper and lower speakers may emit sounds in the same direction. As a result, even when two speakers are used, a mono sound effect may be exhibited as if a single speaker is used.

SUMMARY

Embodiments of the disclosure may provide an apparatus and a method foe enabling a foldable mobile device (hereinafter, referred to as an electronic device) to have a stereo sound effect in both a folded and unfolded status.

An electronic device according to various example embodiments of the disclosure may include: a first housing, a second housing configured to rotate about a folding axis between a first state in which the second housing faces the first housing and a second state in which the second housing is unfolded by a specified angle from the first state, at least one hinge structure comprising a hinge providing the folding axis and disposed between the first housing and the second housing to rotatably connect the first housing and the second housing, a hinge cover accommodating the hinge structure therein and selectively exposed based on the rotation of the second housing, a first speaker module including a speaker accommodated in the first housing, and a second speaker module including a speaker accommodated in the second housing, wherein in the first state, the first speaker module is configured to discharge sound to the outside of the electronic device via a first area provided in the first housing, a second area provided in the hinge structure and in contact with the first area, and a first through-hole extending through the hinge cover exposed to the outside in the first state, and configured to be selectively closed based on the rotation of the second housing.

An electronic device according to various example embodiments of the disclosure may include: a first housing, a second housing configured to rotate about a folding axis between a first state in which the second housing faces the first housing and a second state in which the second housing is unfolded by a specified angle from the first state, at least one hinge structure including a hinge providing the folding axis and disposed between the first housing and the second housing to rotatably connect the first housing and the second housing, a hinge cover accommodating the hinge structure therein and selectively exposed based on the rotation of the second housing, a first seal attached to the first housing and disposed between the first housing and the hinge cover, and a second seal attached to the second housing and disposed between the second housing and the hinge cover.

An electronic device according to various example embodiments of the disclosure may discharge sounds through both ends of the electronic device during folding of the electronic device (for example, foldable mobile device), through a first through-hole formed through a hinge cover such that the same can be exposed to the outside. Accordingly, the electronic device may provide a stereo sound effect.

According to various example embodiments of the disclosure, the first through-hole may be designed to be positioned inside the electronic device during un-folding of the foldable mobile device such that sounds output from a first speaker module are transferred into the electronic device even through the first through-hole, and do not leak outwards through a hinge part.

According to various example embodiments of the disclosure, during un-folding of the electronic device, the space in which the first speaker module can resonate may be expanded, thereby increasing the sound volume.

According to various example embodiments of the disclosure, a first or second seal may prevent and/or reduce sounds output from the first speaker module from leaking out of the electronic device during un-folding of the electronic device, and may prevent and/or reduce external foreign materials from infiltrating the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
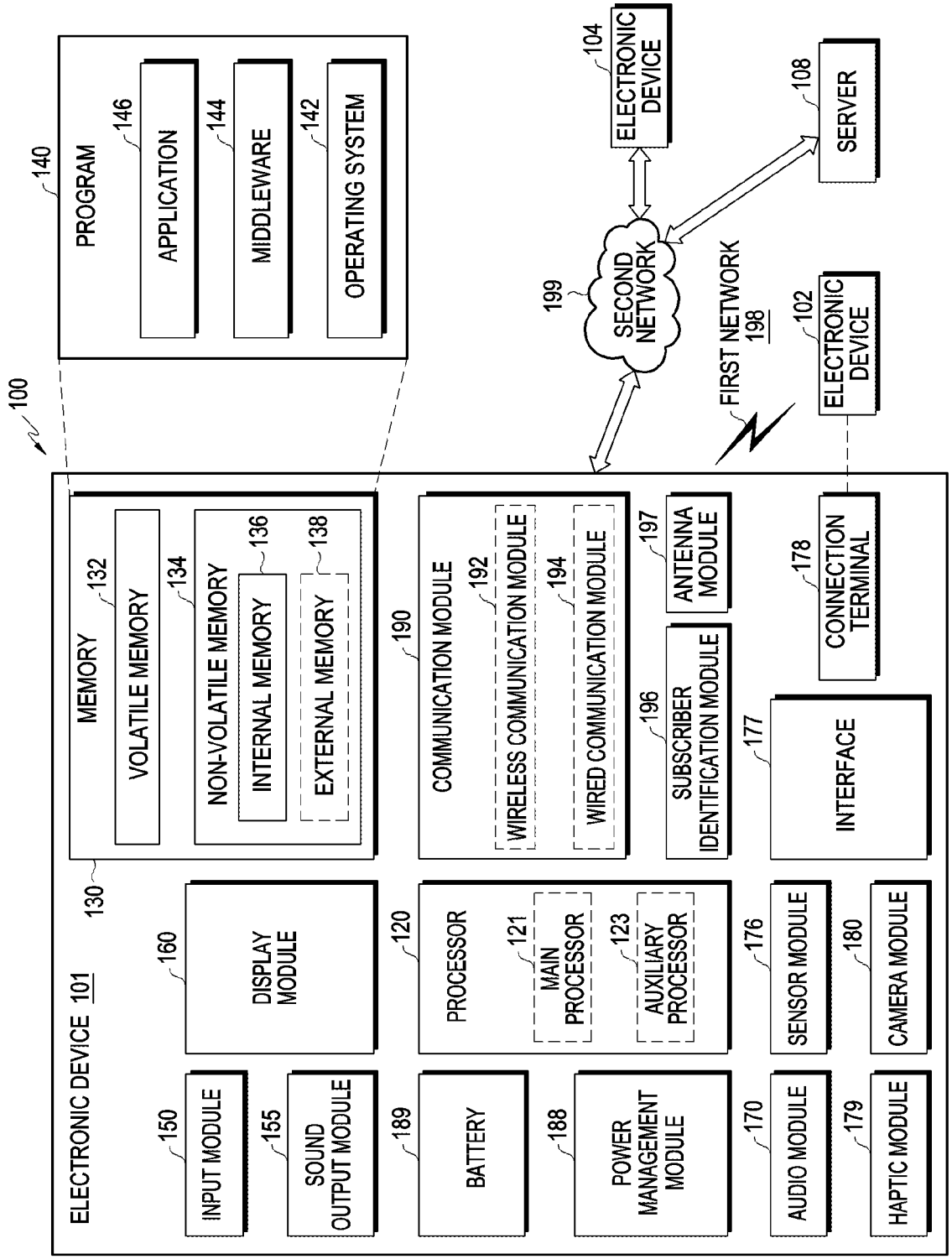
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
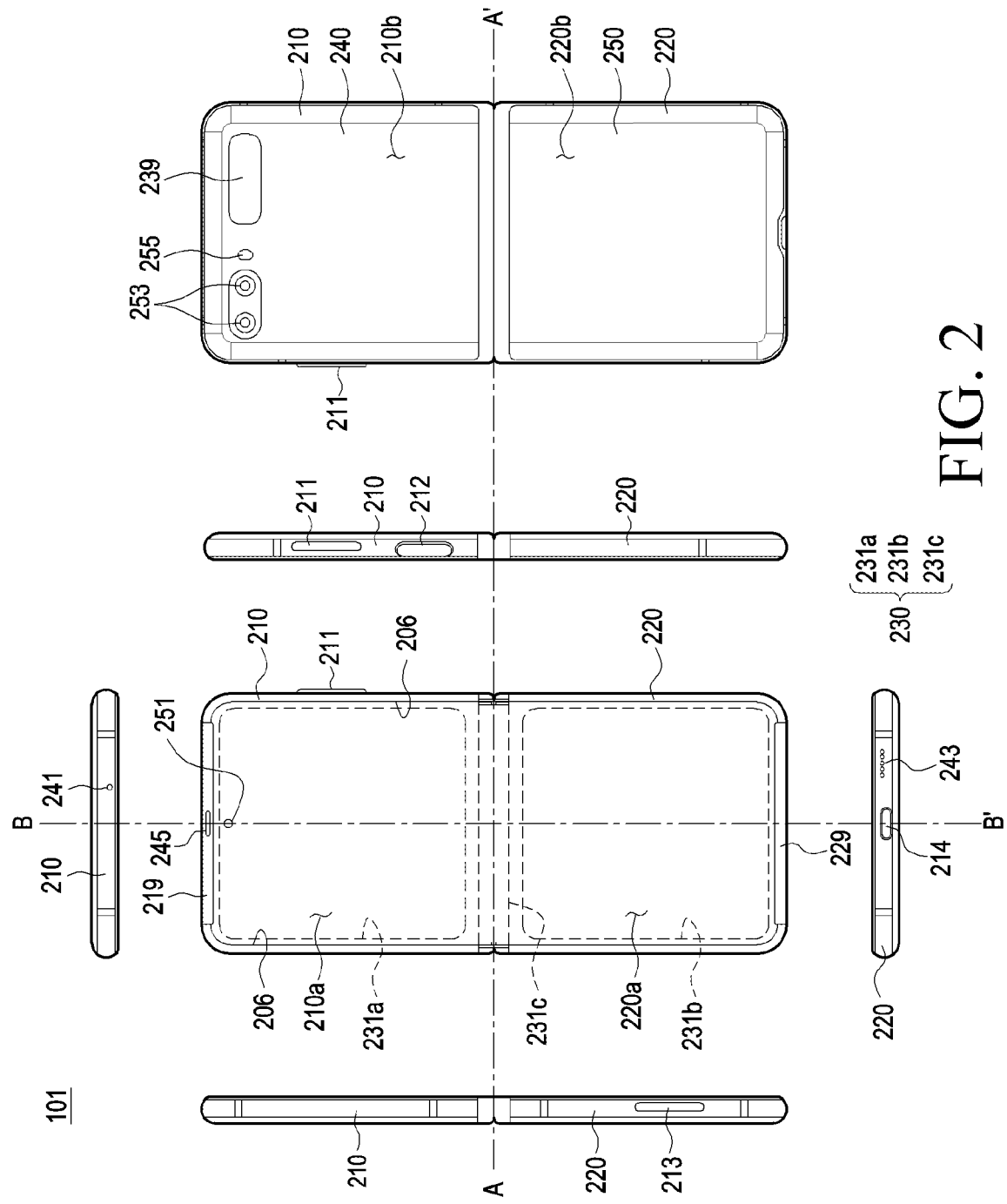
FIG. 2 is a diagram illustrating the front, rear, and sides of an electronic device in an unfolded state according to various embodiments.
Figure 3:
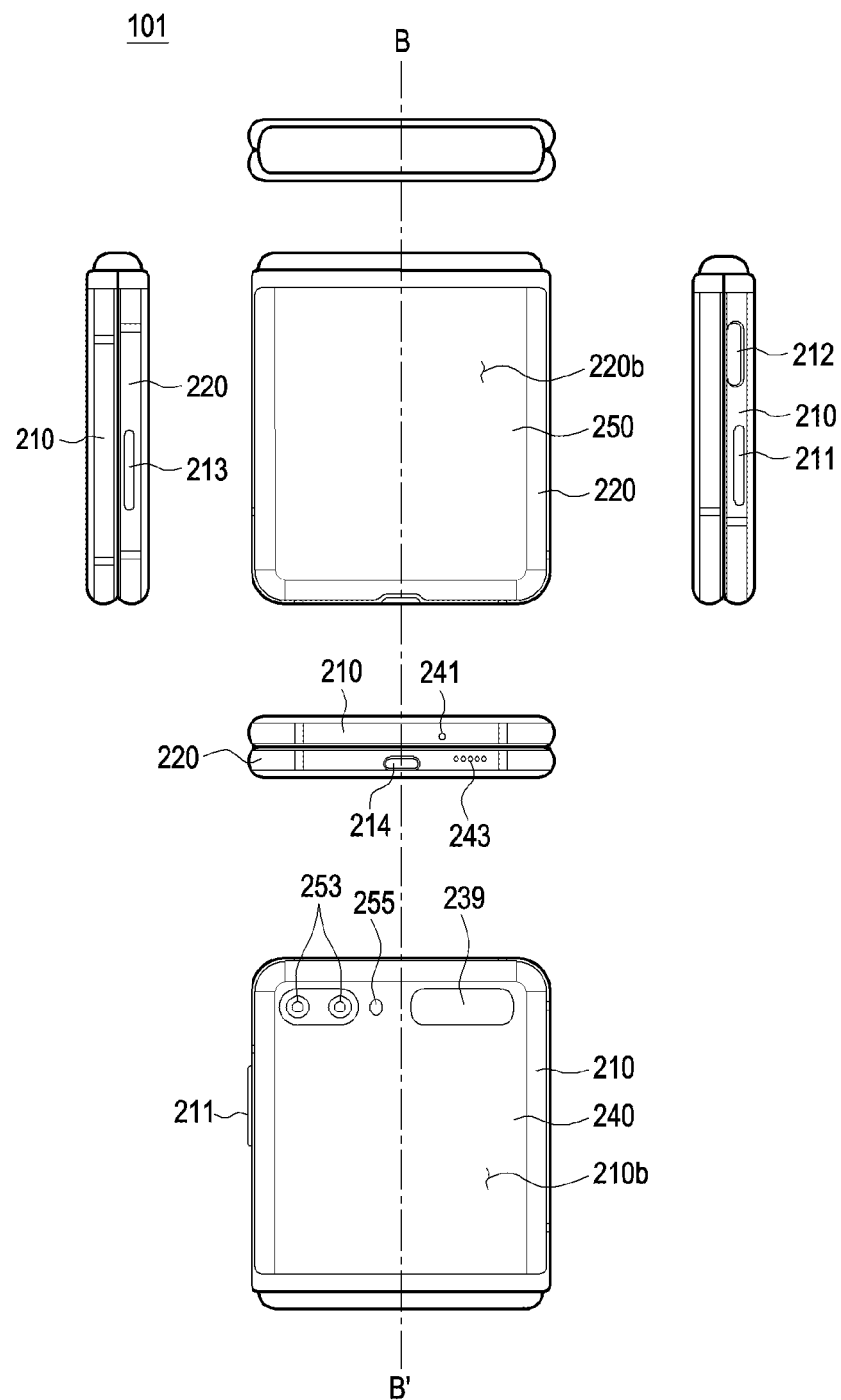
FIG. 3 is a diagram illustrating the front, rear, and sides of an electronic device in a folded state according to various embodiments.

FIG. 2 is a diagram illustrating the front, rear, and sides of an electronic device 101 in an unfolded state according to various embodiments. FIG. 3 is a diagram illustrating the front, rear, and sides of an electronic device 101 in a folded state according to various embodiments.

Referring to FIG. 2 and FIG. 3, an electronic device 101 according to an embodiment may include a first housing 210, a second housing 220, a flexible or foldable display 230 (hereinafter, simply referred to as a "display 230") (e.g., the display module 160 in FIG. 1) disposed in a space provided by the first housing 210 and the second housing 220, and a hinge cover 260.

According to an embodiment, a surface on which the display 230 is disposed may be defined as a front surface of the electronic device 101. The front surface of the electronic device 101 may be provided by a front plate (e.g., a polymer plate or a glass plate including various coating layers), at least a part of which is substantially transparent. A surface opposite to the front surface may be defined as a rear surface of the electronic device 101. The rear surface of the electronic device 101 may be provided by a substantially transparent rear plate (hereinafter, referred to as a "rear cover"). The rear cover may be formed of coated or colored glass, ceramic, a polymer, metal (e.g., aluminum, stainless steel (STS), or magnesium), or a combination of at least two of the above materials. A surface surrounding a space between the front surface and the rear surface may be defined as a side surface of the electronic device 101. The side surface may be provided by a side bezel structure (or a "side member") which couples the front plate and the rear cover and includes metal and/or a polymer. In an embodiment, the rear cover and the side bezel structure may be integrally configured and include the same material (e.g., metal material such as aluminum).

The electronic device 101 may include at least one of a display 230, audio modules 241, 243, and 245, a sensor module 255, a camera module 253, key input devices 211, 212, and 213, and a connector hole 214. According to an embodiment, at least one of the components (e.g., the key input devices 211, 212, and 213) may be omitted from the electronic device 101, or other components (e.g., a light-emitting element) may be additionally included in the electronic device 101.

According to various embodiments, the audio modules 241, 243, and 245 may include a microphone hole 241 and speaker holes 243 and 245. A microphone for acquiring external sounds may be disposed in the microphone hole 241, and in an embodiment, a plurality of microphones for sensing the direction of a sound may be disposed therein. The speaker holes 243 and 245 may include an external speaker hole 243 and a call receiver hole 245. In an embodiment, the speaker holes 243 and 245 and the microphone hole 241 may be implemented as a single hole or a speaker (e.g., a piezo speaker) may be included without a speaker hole 243 and 245. The numbers and positions of the microphone hole 241 and the speaker holes 243 and 245 may be variously changed according to embodiments.

According to various embodiments, the audio modules 241, 243, and 245 may include a microphone hole 241 and a speaker hole 243 and 245. A microphone for acquiring external sounds may be disposed in the microphone hole 241, and in an embodiment, a plurality of microphones for sensing the direction of a sound may be disposed therein. The speaker holes 243 and 245 may include an external speaker hole 243 and a call receiver hole 245. In an embodiment, the speaker hole 243 and 245 and the microphone hole 241 may be implemented as a single hole or a speaker (e.g., a piezo speaker) may be included without a speaker hole 243 and 245. The numbers and positions of the microphone hole 241 and the speaker hole 243 and 245 may be variously changed according to embodiments.

According to various embodiments, the camera module 253 may include a first camera device 251 disposed on a first surface 210a of the first housing 210 of the electronic device 101 and a second camera device 253 disposed on a second surface 210b thereof. The electronic device 101 may further include a flash (not illustrated). The camera devices 251 and 253 may include one or more lenses, an image sensor, and/or an image signal processor. The flash (not illustrated) may include, for example, a light emitting diode or a xenon lamp.

According to various embodiments, the sensor module 255 may generate an electrical signal or a data value corresponding to an internal operating state of the electronic device 100 or an external environmental state. Although not illustrated in the drawings, the electronic device 101 may additionally or alternatively include another sensor module (e.g., the sensor module 176 in FIG. 1) in addition to the sensor module 255 provided on the second surface 210b of the first housing 210. The electronic device 101 is a sensor module and may include at least one of, for example, a proximity sensor, a fingerprint sensor, an HRM sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to various embodiments, the key input devices 211, 212, and 213 may be located on a side surface of a foldable housing (e.g., the first housing 210 or the second housing 220). According to an embodiment, the electronic device 101 may not include a part or all of the mentioned key input devices 211, 212, and 213, and the key input device which is not included therein may be implemented on the display 230 as a different form such as a soft key. In an embodiment, the key input device may be configured such that a key input is implemented by a sensor module (e.g., a gesture sensor).

According to various embodiments, the connector hole 214 may be configured to accommodate a connector (for example, a USB connector) configured to transmit and receive power and/or data to and from an external electronic device, or additionally or alternatively-, accommodate a connector configured to transmit and receive audio signals to and from an external electronic device.

According to various embodiments, a foldable housing may be implemented by an assembly of the first housing 210, the second housing 220, a first rear cover 240, a second rear cover 250, and a hinge module (e.g., the hinge structure 340 in FIG. 4 described later). The foldable housing of the electronic device 101 is not limited to the shape and assembly illustrated in FIG. 2, but may be implemented by a combination and/or an assembly of different shapes or components. For example, in an embodiment, the first housing 210 and the first rear cover 240 may be integrally configured and the second housing 220 and the second rear cover 250 may be integrally configured. According to various embodiments disclosed herein, the wording "housing" may refer to a configuration in which various components not mentioned above are combined and/or assembled. For example, it may be described that a first area 213a of the display 230 forms one surface of the first housing 210, and in an embodiment, it may be described that the first area 213a of the display 230 is disposed on or attached to one surface of the first housing 210.

According to various embodiments, the first housing 210 may be connected to a hinge structure (e.g., the hinge structure 340 in FIG. 4 described later), and may include a first surface 210a facing a first direction and a second surface 210b facing a second direction opposite to the first direction. The second housing 220 may be connected to a hinge structure (e.g., the hinge structure 340 in FIG. 4 described later), include a third surface 220a facing a third direction and a fourth surface 220b facing a fourth direction opposite to the third direction, and rotate or pivot about the hinge structure (or a folding axis A) with respect to the first housing 210.

According to various embodiments, the first housing 210 and the second housing 220 may be arranged on opposite sides (or upper/lower sides) around the folding axis A and may have an overall symmetrical shape about the folding axis A. The angle or distance between the first housing 210 and the second housing 220 may vary depending on whether the electronic device 101 is in the unfolded state, in the folded state, or in the partially unfolded (or partially folded) intermediate state. According to an embodiment, unlike the second housing 220, the first housing 210 may additionally include various sensors. However, the first housing 210 and the second housing 220 may have mutually symmetrical shapes in other areas.

According to various embodiments, at least a part of the first housing 210 and the second housing may be made of a metal material or a non-metal material having the rigidity of a level selected to support the display 230. The at least a part made of the metal material may be provided as a radiating conductor or a ground plane of the electronic device 101, and may be electrically connected to a ground line provided on a printed circuit board (e.g., the printed circuit board 330 in FIG. 4) in a case of being provided as a ground plane.

According to various embodiments, the first rear cover 240 may be disposed at one side (e.g., an upper side in FIG. 2) of the folding axis A on the rear surface of the electronic device 101, and may have, for example, a substantially rectangular periphery, and the periphery may be surrounded by the first housing 210 (and/or the side bezel structure). Similarly, the second rear cover 250 may be disposed at the other side (e.g., a lower side in FIG. 2) of the folding axis A on the rear surface of the electronic device 101, and the periphery thereof may be surrounded by the second housing 220 (and/or the side bezel structure).

According to various embodiments, the first rear cover 240 and the second rear cover 250 may have substantially symmetrical shapes about the folding axis A. However, the first rear cover 240 and the second rear cover 250 do not necessarily have mutually symmetrical shapes, and in an embodiment, the electronic device 101 may include the first rear cover 240 and the second rear cover 250, which have various shapes. In still an embodiment, the first rear cover 240 may be configured integrally with the first housing 210 and the second rear cover 250 may be configured integrally with the second housing 220.

Figure 4:
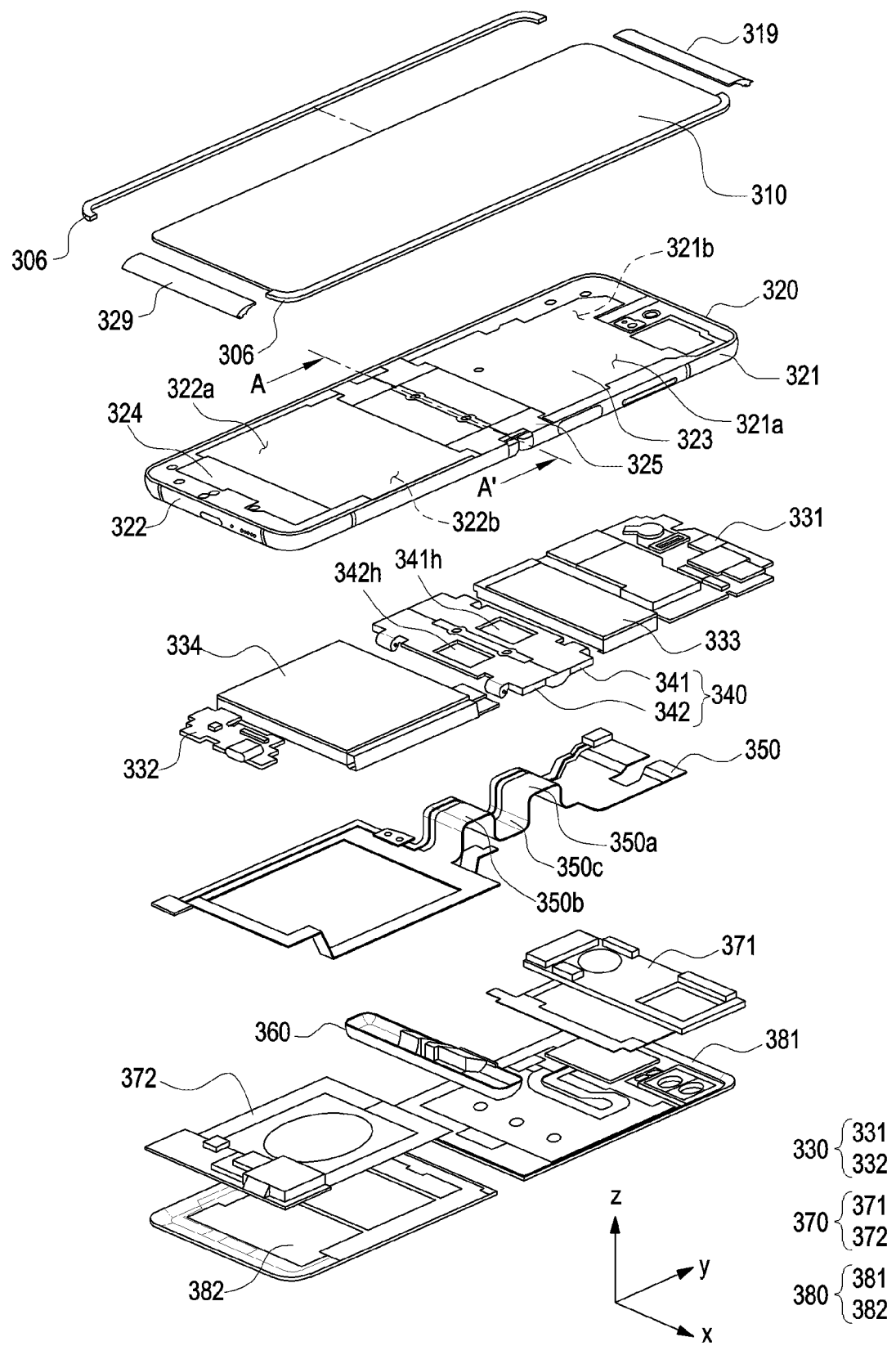
FIG. 4 is an exploded perspective view of an electronic device according to various embodiments.

According to various embodiments, the first rear cover 240, the second rear cover 250, the first housing 210, and the second housing 220 may define a space in which various components (e.g., the printed circuit board 330 or the batteries 333 and 334 in FIG. 4) of the electronic device 101 can be arranged. According to an embodiment, one or more components may be disposed or visually exposed on the rear surface of the electronic device 101. For example, at least a part of a sub-display 239 may be visually exposed through the first rear cover 240. In an embodiment, one or more components or sensors may be visually exposed through the first rear cover 240. In various embodiments, the components or sensors may include a proximity sensor, a rear camera, and/or a flash. In addition, although not separately illustrated in the drawings, one or more components or sensors may be visually exposed through the second rear cover 250.

According to various embodiments, a front camera 251, which is exposed to the front surface of the electronic device 101 through one or more openings, or a rear camera 253, which is exposed through the first rear cover 240, may include one or more lenses, an image sensor, and/or an image signal processor. The flash (not illustrated) may include, for example, a light-emitting diode or a xenon lamp. In an embodiment, two or more lenses (e.g., an infrared camera, a wide-angle lens, and a telephoto lens), and image sensors may be arranged on one surface of the electronic device 101.

According to various embodiments, the electronic device 101 may be changeable into a folded state in which a display is folded or an unfolded state in which a display is unfolded. For example, between the folded state of facing each other and the unfolded state by a determined angle (e.g., the state in which the terminal is unfolded, the state being illustrated in FIG. 2), the first housing 210 and the second housing 220 may rotate with respect to each other.

According to various embodiments, as the first housing 210 and the second housing 220 rotate with respect to each other, the electronic device 101 may include a first housing and a second housing. The first state may include a folded state in which the first housing 210 and the second housing face each other, and may be a state in which the angle defined by the first housing 210 and the second housing 220 is less than a determined angle (e.g., A° in FIG. 11B). The second state may include a state in which a terminal is unfolded, and may be a state in which the angle defined by the first housing 210 and the second housing 220 is greater than or equal to a determined angle (e.g., A° in FIG. 11B).

FIG. 2 illustrates a state in which the first housing 210 and the second housing 220 are unfolded to form an angle of 180 degrees, and in the folded state (e.g., the first state), the first area 231a and the second area 231b of the display 230 are positioned to face each other and the folding area 231c may be changed into a curved shape.

According to various embodiments, the electronic device 101 may be implemented in two ways of an "in-folding" way of being folded such that the first area 231a and the second area 231b face each other and an "out-folding" way of being folded such that the first area 221a and the second area 231 face directions opposite to each other. For example, in a folded state in the in-folding manner, the first area 231a and the second area 231b may be substantially hidden, and in a completely unfolded state, the first area 231a and the second area 231b may be arranged to face substantially the same direction. In another example, in a folded state in the out-folding manner, the first area 231a and the second area 231b may be arranged to face directions opposite to each other and exposed to the outside, and in a completely unfolded state, the first area 231a and the second area 231b may be arranged to face substantially the same direction.

According to various embodiments, the display 230 may include a display panel (not illustrated) and a window member (not illustrated), and may be made of a flexible material. Although not separately illustrated, a person ordinarily skilled in the art may easily understand that the display 230 or the display panel includes various layer(s) such as a light-emitting layer, substrate(s) configured to encapsulate the light-emitting layer, an electrode or a wiring layer, and/or adhesive layer(s) configured to adhere adjacent and different layers. When the display 230 (e.g., the folding area 231c) is changed into a flat plate-shape and a curved surface-shape, a relative displacement may occur between the layers of the display 230. The relative displacement according to the changed shape of the display 203 may increase as the distance from the folding axis A increases and/or as the thickness of the display 230 increases.

According to various embodiments, a window member such as a thin film plate may serve as a protective film configured to protect a display panel. As a protective film, the thin film plate may protect the display panel from external shocks, may be scratch resistant, and may use a material which reduces wrinkles in the folding area 231c even during repeated folding and unfolding operations of the housings 210 and 220. For example, as a material of the thin film plate, a clear polyimide (CPI) or an ultra-thin glass (UTG) may be included.

According to various embodiments, the electronic device 101 may further include decorative cover(s) 219 and 229 or protective member(s) 206 arranged at at least a portion of an edge of the display 230 on a front surface (e.g., the first surface 210a or the third surface 220a). The protective member 206 or decorative cover 219 and 229 may prevent at least a portion of the edge of the display 230 from coming into contact with a mechanical structure (e.g., the first housing 210 or the second housing 220) and may provide a decorative effect on the appearance of the electronic device 101. The configurations of the protective member 206 and decorative cover 219 and 229 described above will be described in more detail with reference to FIG. 4 to FIG. 10.

FIG. 4 is an exploded perspective view of an electronic device 101 (e.g., the electronic device 101 in FIG. 2) according to various embodiments.

Referring to FIG. 4, in various embodiments, the electronic device 101 may include a display 310 (e.g., the display 230 in FIG. 2), a foldable housing (e.g., a first housing 321 and a second housing 322, and the first housing 210 and the second housing 220 in FIG. 2), a printed circuit board 330, a hinge structure 340, a flexible connection member 350, a hinge cover 360 (e.g., the hinge cover 260 in FIG. 3), an antenna module 370, and a rear cover 380. In an embodiment, the electronic device 101 may include at least one protective member 306 and/or at least one decorative cover 319 and 329, and the protective member 306 and/or decorative cover 319 and 329 may be arranged adjacent to at least a portion of the periphery of the display 310 (e.g., the display 230 in FIG. 2).

According to various embodiments, the display 310 may be exposed through a substantial portion of a front surface of the electronic device 101. In an embodiment, the shape of the display 310 may be substantially the same as the shape of the periphery of the front surface of the electronic device 101.

In FIG. 4, "Y" may refer, for example, to a longitudinal direction of the electronic device 101 in a second state. In an embodiment of the disclosure, "+Y" may refer, for example, to an upward direction of the electronic device 101 with respect to the folding axis A of the electronic device 101, and "−Y" may refer, for example, to a downward direction of the electronic device 101 with respect to the folding axis A of the electronic device 101.

According to various embodiments, the foldable housing of the electronic device 101 may include a first housing 321 and a second housing 322. According to an embodiment, the first housing 321 may include a first surface 321a and a second surface 321b facing away from the first surface 321a, and the second housing 322 may include a third surface 322a and a fourth surface 322b facing away from the third surface 322a. The electronic device 101 or the foldable housing 321 and 322 may additionally or alternatively include a bracket assembly 325. The bracket assembly 325 may include a first bracket assembly 323 disposed at the first housing 321 and a second bracket assembly 324 disposed at the second housing 322. At least a portion of the bracket assembly 325, such as at least a portion of the first bracket assembly 323 and at least a portion of the second bracket assembly 324, may serve as a plate configured to support the hinge structure 340.

According to various embodiments, on the printed circuit board 330, various electric elements may be arranged. For example, on the printed circuit board 330, a processor (e.g., the processor 120 in FIG. 1), a memory (e.g., the memory 130 in FIG. 1), and/or an interface (e.g., the interface 177 in FIG. 1) may be mounted. The processor may include one or more of, for example, a central processing unit, an application processor, a graphics processor, an image signal processor, a sensor hub processor, or a communication processor. The memory may include, for example, a volatile memory or a nonvolatile memory. The interface may include, for example, a high-definition multimedia interface (HDMI), a universal serial bus (USB) interface, an SD card interface, and/or an audio interface. The interface may electrically or physically connect, for example, the electronic device 101 to an external electronic device, and may include a USB connector, an SD card/an MMC connector, or an audio connector.

According to various embodiments, the printed circuit board 330 may include a first printed circuit board 331 disposed on a first bracket assembly 323 side and a second printed circuit board 332 disposed on a second bracket assembly 324 side. The first printed circuit board 331 and the second printed circuit board 332 may be arranged in a space provided by the foldable housing 321 and 322, the bracket assembly 325, a first rear cover 381, and/or a second rear cover 382. Components for implementing various functions of the electronic device 101 may be respectively separated and arranged on the first printed circuit board 331 and the second printed circuit board 332. For example, the processor may be disposed on the first printed circuit board 331 and the audio interface may be disposed on the second printed circuit board 332.

According to various embodiments, batteries 333 and 334 configured to supply power to the electronic device 101 may be disposed adjacent to the printed circuit board 330. At least a portion of the batteries 333 and 334 may be arranged, for example, on substantially the same plane as the printed circuit board 330. According to an embodiment, a first battery 333 may be disposed adjacent to the first printed circuit board 331 and a second battery 334 may be disposed adjacent to the second printed circuit board 332. The batteries 333 and 334 are devices for supplying power to at least one component of the electronic device 101, and may include, for example, a non-rechargeable primary battery, a rechargeable secondary battery, or a fuel cell. The batteries 333 and 334 may be integrally disposed inside the foldable housing 321 and 322, or may be detachably disposed on the foldable housing 321 and 322.

According to various embodiments, the hinge structure 340 may provide a folding axis (e.g., the folding axis A in FIG. 2) and may be an element for rotatably connecting or coupling the bracket assembly 325 and/or the foldable housing 321 and 322. The hinge structure 340 may include a first hinge structure 341 disposed on the first printed circuit board 331 side and a second hinge structure 342 disposed on the second printed circuit board 332 side. The hinge structure 340 may be disposed between the first printed circuit board 331 and the second printed circuit board 332. According to an embodiment, the hinge structure 340 may be substantially configured integrally with at least a portion of the first bracket assembly 323 and at least a portion of the second bracket assembly 324.

According to various embodiments, the "housing structure" may include the foldable housing 321 and 322 and may refer to what is configured by coupling and/or assembling at least one element disposed inside the foldable housing 321 and 322. The housing structure may include a first housing structure and a second housing structure. For example, the "first housing structure" may be referred to as the configuration in which at least one of the first housing 321, the first bracket assembly 323 disposed inside the first housing 321, the first printed circuit board 331, and the first battery 333 are included and assembled. In another example, the "second housing structure" may be referred to as the configuration in which at least one of the second housing 322, the second bracket assembly 324 disposed inside the second housing 322, the second printed circuit board 332, and the second battery 334 are included and assembled. However, it should be noted that the "first housing structure and second housing structure" is not limited to the addition of the elements described above and may additionally include or omit other various elements.

According to various embodiments, the flexible connection member 350 may be, for example, a flexible printed circuit board (FPCB). The flexible connection member 350 may connect various electric elements arranged on the first printed circuit board 331 and the second printed circuit board 332. To this end, the flexible connection member 350 may be disposed to cross the "first housing structure" and the "second housing structure". According to an embodiment, the flexible connection member 350 may be disposed to cross at least a portion of the hinge structure 340. According to an embodiment, for example, the flexible connection member 350 may be configured to cross the hinge structure 340 along a direction parallel to a y-axis in FIG. 4 to connect the first printed circuit board 331 and the second printed circuit board 332. In another example, the flexible connection member 350 may be disposed or extend through openings 341h and 342h provided in the hinge structure 340. In this case, a portion 350a of the flexible connection member 350 may be disposed to be hung on one side (e.g., an upper portion) of the first hinge structure 341 and another portion 350b of the flexible connection member 350 may be disposed to be hung on one side (e.g., an upper portion) of the second hinge structure 342. In addition, still another portion 350c of the flexible connection member 350 may be disposed on the other side (e.g., a lower portion) of the first hinge structure 341 and the second hinge structure 342. At a position adjacent to the first hinge structure 341 and the second hinge structure 342, a space (hereinafter, referred to as a "wiring space") surrounded by at least a portion of the first hinge structure 341, at least a portion of the second hinge structure 342, and at least a portion of the hinge cover 360 may be provided. According to an embodiment, at least a portion 350c of the flexible connection member 350 may be disposed in the wiring space.

According to various embodiments, the hinge cover 360 may be configured to surround or accommodate at least a portion of the wiring space or the hinge structure 340. In an embodiment, the hinge cover 360 may provide a wiring space with the hinge structure 340 and may protect an element (e.g., at least a portion 350c of the flexible connection member 350) disposed in the wiring space from external impact. According to an embodiment, the hinge cover 360 may be disposed between the first housing 321 and the second housing 322. In the in-folding type electronic device 101, the hinge cover 360 may be at least partially hidden by the foldable housing 321 and 322. For example, in a folded state, the hinge cover 360 may be visually exposed to an external space between a rear surface (e.g., the first rear cover 381) of the first housing 321 and a rear surface (e.g., the second rear cover 382) of the second housing 322, and in an unfolded state, may be substantially accommodated in the first housing 321 or the second housing 322 to be visually hidden.

According to various embodiments, the antenna module 370 (e.g., the antenna module in FIG. 1) may be disposed between the rear cover 380 and the batteries 333 and 334. According to an embodiment, the antenna module 370 may include a first antenna module 371 disposed on a first housing 321 side and a second antenna module 372 disposed on a second housing 322 side. The antenna module 370 may include, for example, a near field communication (NFC) antenna, a wireless charging antenna, and/or a magnetic secure transmission (MST) antenna so as to perform short-range communication with an external electronic device, or may transmit/receive power required for charging to/from the external device in a wireless manner. In an embodiment, an antenna structure may be formed with a part of the bracket assembly and/or the side bezel structure of the foldable housing 321 and 322, or a combination thereof.

According to various embodiments, the rear cover 380 may include the first rear cover 381 and the second rear cover 382. The rear cover 380 may be coupled to the foldable housing 321 and 322 so as to protect the above-mentioned elements (e.g., the printed circuit board 330, the batteries 333 and 334, the flexible connection member 350, and the antenna module 370) disposed in the foldable housing 321 and 322. As described above, the rear cover 380 may be substantially configured integrally with the foldable housing 321 and 322.

According to various embodiments, the protective member 306 and/or the decorative cover 319 and 329 (e.g., the protective member 206 and/or the decorative cover 219 and 229 in FIG. 2) may protect at least a portion of the edge of the display 310. In an embodiment, the protective member 306 may be disposed between the edge of the display 310 and an inner wall of the first housing 321 and/or between the edge of the display 310 and an inner wall of the second housing 322 so as to prevent and/or reduce the direct contact to the edge of the display 310 and the inner wall of the foldable housing 321 and 322. In an embodiment, the decorative cover 319 may be disposed at at least one of the first housing 310 and the second housing 320 and may be disposed to cover a portion of the edge of the display 310. The configuration of the protective member 306 and the decorative cover 319 described above will be described in more detail with reference to FIG. 5 to FIG. 19.

Figure 5:
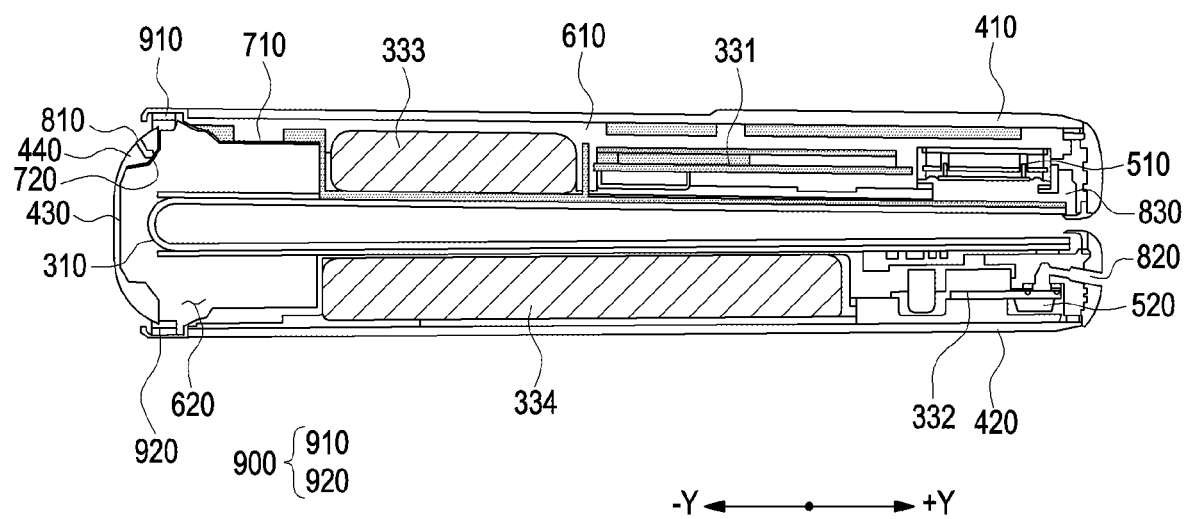
FIG. 5 is a cross-sectional view illustrating an electronic device taken along line B-B' in a first state (e.g., a folded state) of FIG. 3 according to various embodiments.
Figure 6:
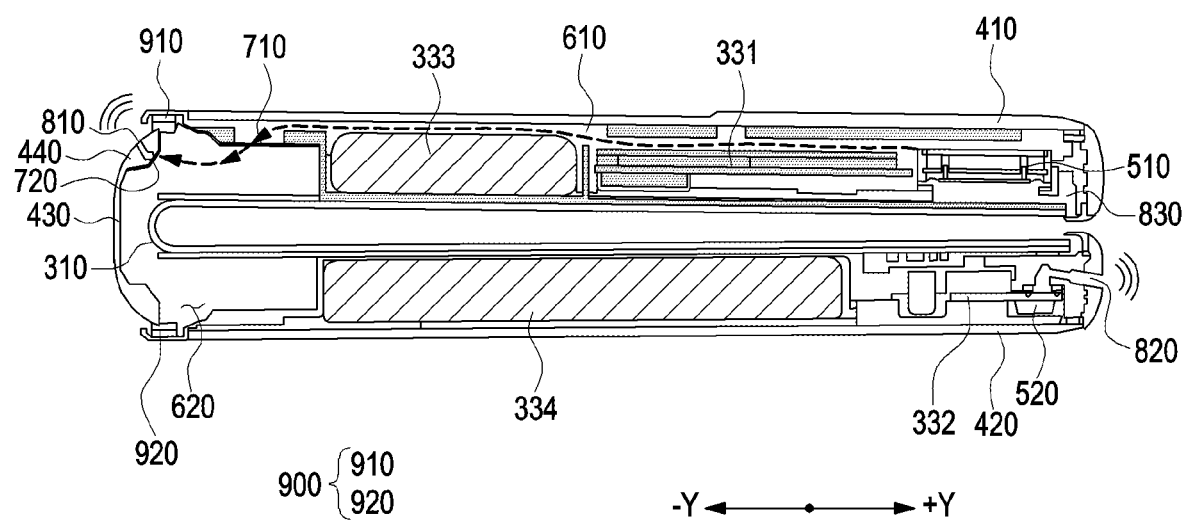
FIG. 6 is a cross-sectional view illustrating an electronic device taken along line B-B' in a first state (e.g., a folded state) of FIG. 3 and illustrating a movement route of the sound discharged through a first speaker module when the electronic device 101 is in the first state (e.g., the folded state) according to various embodiments.

FIG. 5 is a cross-sectional view illustrating an electronic device 101 taken along line B-B' in a first state (e.g., a folded state) of FIG. 3 according to various embodiments. FIG. 6 is a cross-sectional view illustrating an electronic device 101 taken along line B-B' in a first state (e.g., a folded state) of FIG. 3 and illustrating a movement route of the sound discharged through a first speaker module 510 when the electronic device 101 is in the first state (e.g., the folded state) according to various embodiments.

Referring to FIG. 5 and FIG. 6, the electronic device 101 according to various embodiments, may include a first housing 410, a second housing 420, a hinge structure 430, a hinge cover 440, a first speaker module 510, a second speaker module 520, a first area 610, a second area 620, a first member 710, a second member 720, a first through-hole 810, and a sealing member 900. The first housing 410, the second housing 420, the hinge structure 430, and the hinge cover 440 in FIG. 5 and FIG. 6 may be partially or wholly the same as the configurations of the first housing 321, the second housing 322, the hinge structure 340, and the hinge cover 360 in FIG. 4.

In FIG. 5 and FIG. 6, "Y" may refer, for example, to a longitudinal direction of the electronic device 101 in a first state. In an embodiment of the disclosure, "+Y" may refer, for example, to an upward direction of the electronic device, and "−Y" may refer, for example, to a downward direction of the electronic device.

According to various embodiments, referring to FIG. 5, in a first state in which the first housing 410 and the second housing 420 of the electronic device 101 face each other, the first speaker module 510 may be disposed at an end in an upward direction (a +Y direction) in the first housing 410. The second speaker module 520 may be disposed at an end in an upward direction (a +Y direction) in the second housing 420. Accordingly, in the first state, the first speaker module 510 and the second speaker module 520 may be positioned at one end of the electronic device 101.

According to various embodiments, as the second housing 420 in which the second speaker module 520 is accommodated rotates about the hinge structure 430 with respect to the first housing 410, in a second state of being unfolded from the first state by a predetermined angle, the first speaker module 510 may be positioned at the end in the upward direction (the +Y direction) of the electronic device 101 and the second speaker module 520 may be positioned at the end in the downward direction (−Y direction) thereof. As the sound is simultaneously output from the upward direction (+Y direction) and downward direction (−Y direction) of the electronic device 101, the volume may increase when playing music and sound quality and performance may be improved by dividing a sound source into upper and lower parts (hereinafter, defined as a "stereo sound effect").

According to various embodiments, the first area 610 may be a resonance space provided adjacent to the first speaker module 510 in the first housing 410 of the electronic device 101. Therefore, it may be a space provided to allow the sound output from the first speaker module 510 to resonate. The first area 610 may be, for example, about 9 cc.

According to various embodiments, the second area 620 may be space in the hinge structure 430 disposed between the first housing 410 and the second housing 420. That is, an empty space among the space of the hinge structure 430 may be utilized as a resonance space. The second area 620 may be, for example, more than or equal to 1 cc and less than or equal to 1.5 cc. The second area 620 may be about 1.33 cc.

According to various embodiments, the first member 710 may be disposed between the first area 610 and the second area 620. For example, the first member 710 may be disposed at at least a portion of a boundary area which divides the first housing 410 and a portion in which the hinge structure 430 is accommodated. Accordingly, by connecting the first area 610 and the second area 620, the sound output from the first speaker module 510 may be transferred from the first area 610 to the second area 620. The first member 710 may perform a waterproof and dustproof function to prevent and/or block/reduce a foreign material which has entered the inside of the electronic device 101 through the first through-hole 810 from entering the inside.

According to various embodiments, the second member 720 may be disposed on at least one surface of the hinge cover 440. For example, at least a portion of the second member 720 may be in contact with a first sound hole 810 extending through the hinge cover 440. Accordingly, the second member 720 may connect the second area 620 and the first through-hole 810. The second member 720 may perform a waterproof and dustproof function to prevent and/or block/reduce a foreign material which has entered the inside of the electronic device 101 through the first through-hole 810 from entering the inside.

According to various embodiments, the first member 710 or the second member 720 may include a mesh member. For example, it may be configured by a sheet of a material (e.g., metal, stainless steel, and/or another random material) having a plurality of perforated portions aligned in different directions. The perforated portions may be generated by a laser perforation and/or other appropriate processes.

According to various embodiments, the hinge cover 440 may be disposed between the first housing 410 and the second housing 420 and may accommodate at least a portion of the hinge structure 430 therein. The hinge cover 440 may be selectively exposed to the outside according to the rotation of the second housing 420.

According to various embodiments, the first through-hole 810 may extend through the hinge cover 440. For example, the first through-hole 810 may extend through the hinge cover 440 at an end portion of the hinge cover 440. According to various embodiments, the first through-hole 810 may be selectively exposed to the outside according to the rotation of the first housing with respect to the second housing 420. For example, when the electronic device 101 is in the first state, the hinge cover 440 and the first through-hole 810 may be exposed to the outside. Accordingly, the sound output from the first speaker module 510 may be discharged to the outside through the first through-hole 810 via the first area 610, the second area 620. For example, when the electronic device 101 is in the second state, the end portion of the hinge cover 440 may be positioned in the second housing 420 or the first housing 410. Accordingly, the first through-hole 810 is closed so as to prevent and/or reduce the sound output from the first speaker module 510 from being discharged to the outside through the first through-hole 810.

According to various embodiments, a second through-hole 820 may be disposed adjacent to the second speaker module 520 and may guide the sound generated from the second speaker module 520 to be radiated to the outside. In addition, a third through-hole 830 may be disposed adjacent to the first speaker module 510 and may guide the sound generated from the first speaker module 510 to be radiated to the outside.

According to various embodiments, referring to FIG. 6, the movement route of the sound when the electronic device 101 is in the first state may be as follows. The sound output from the first speaker module 510 may be discharged in the downward direction (the −Y direction) of the electronic device 101 via the first area 610, the first member 710, the second area 620, the second member 720, and the first through-hole 810. In addition, the sound output from the second speaker module 520 may be discharged in the upward direction (the +Y direction) of the electronic device 101 via the sound speaker module 520 and the second through-hole 820 which connects the second speaker module 520 to the outside of the electronic device 101. As the sound is discharged in the upward direction (the +Y direction) and the downward direction (the −Y direction) of the electronic device 101, the electronic device 101 may have a stereo sound effect even in the first state.

Figure 7A:
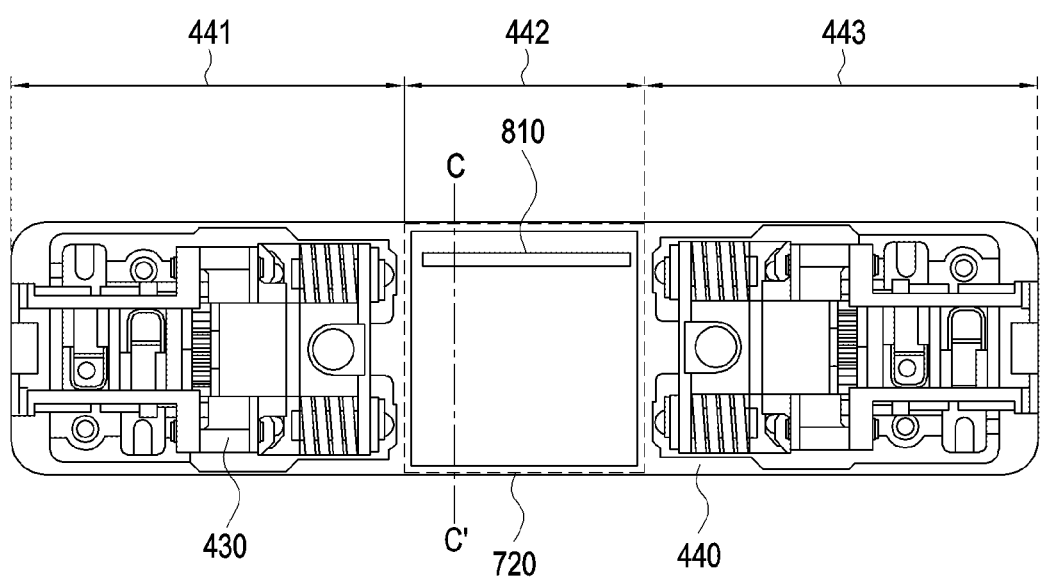
FIG. 7A is a front view illustrating an arrangement relationship between a first through-hole and a hinge cover inside which a hinge structure of an electronic device is accommodated according to various embodiments.
Figure 7B:
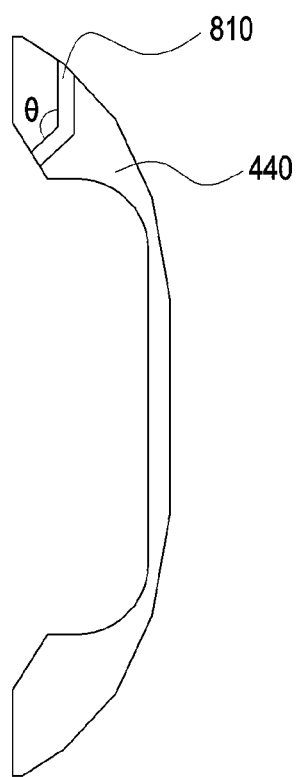
FIG. 7B is a cross-sectional view illustrating the hinge cover of FIG. 7A taken along line C-C' according to various embodiments.

FIG. 7A is a front view illustrating an arrangement relationship between a first through-hole 810 and a hinge cover 440 inside which a hinge structure 430 of an electronic device 101 is accommodated according to various embodiments. FIG. 7B is a cross-sectional view illustrating the hinge cover 440 of FIG. 7A taken along line C-C' according to various embodiments.

Referring to FIG. 7A and FIG. 7B, the electronic device 101 according to various embodiments may include a hinge structure 430, a hinge cover 440, a second member 720, and a first through-hole 810. The hinge structure 430, the hinge cover 440, the second member 720, and the first through-hole 810 in FIG. 7A and FIG. 7B may be partially or wholly the same as the configurations of the hinge structure 430, the hinge cover 440, the second member 720, and the first through-hole 810 in FIG. 6.

According to various embodiments, referring to FIG. 7A, the hinge structure 430 may provide a plurality of rotation axes around the folding axis A. According to an embodiment, the hinge cover 440 may be divided into a first end area 441 which accommodates the hinge structure 430, a second end area 443, and a central area 442. The first through-hole 810 extending through the hinge cover 440 may be positioned in the central area 442 of the hinge cover 440. The second member 720 may include at least a portion of the central area 442.

According to various embodiments, referring to FIG. 7B, the first through-hole 810 may be provided in an end area of the hinge cover 440. The first through-hole 810 may have a shape bent by a predetermined angle θ. For example, the first through-hole 810 may have the shape of capital "L" bent by the predetermined angle θ. The predetermined angle θ may be, for example, about 0 to 180 degrees. An external foreign material may be prevented/reduced from entering the inside of the electronic device 101 via a bent portion of the first through-hole 810 so as to prevent and/or reduce damage to the electronic device 101. However, the shape of the first through-hole 810 is not limited to the above embodiments and may be variously changed in design according to the arrangement relationship or the shape of a lateral structure.

Figure 8:
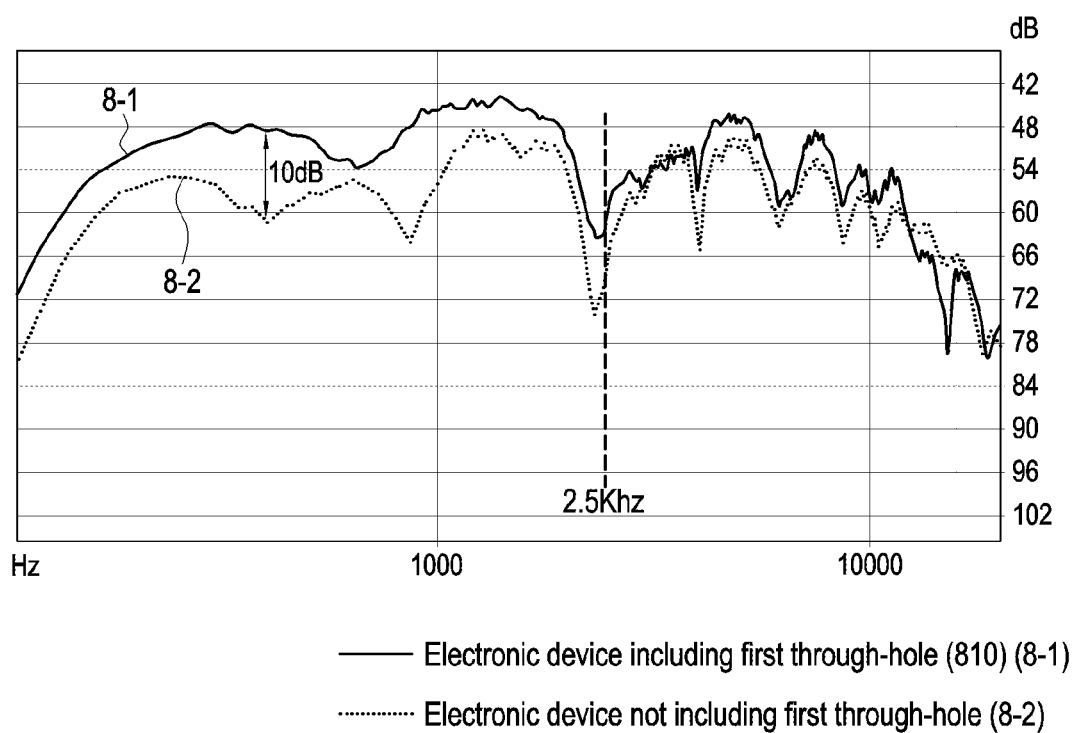
FIG. 8 is a graph showing sound volume for each frequency according to the generation of a first through-hole when an electronic device is in a first state according to various embodiments.

FIG. 8 is a graph showing sound volume for each frequency according to the generation of a first through-hole (e.g., the first through-hole 810 in FIG. 5) when an electronic device (e.g., the electronic device 101 in FIG. 1) is in a first state according to various embodiments of the disclosure.

Referring to FIG. 8, a change in the volume of the sound according to the electronic device including the first through hole may be confirmed. In the graph of FIG. 8, the horizontal axis represents the frequency band (Hz) and the vertical axis represents the sound volume (RMS power) (dB). In the graph of FIG. 8, a solid line graph 8-1 represents the electronic device including the first through-hole 810 provided at the hinge cover (e.g., the hinge cover 440 in FIG. 5), and a dotted line graph 8-2 represents the electronic device not including a first through-hole at a hinge cover. The configuration of the electronic device in FIG. 5 is applicable to that of the electronic device including the first through-hole in FIG. 8.

According to an embodiment, it may be confirmed that the sound volume of the electronic device including the first through-hole increases by 6 dB on average and increases up to about 10 dB in the vicinity of 0-2.5 kHz, which is the voice and the middle and low frequencies, when compared with the electronic device not including the first through-hole. Accordingly, it may be confirmed that the sound is output via the first through-hole so that the stereo sound effect is implemented in the electronic device according to various embodiments of the disclosure.

Figure 9:
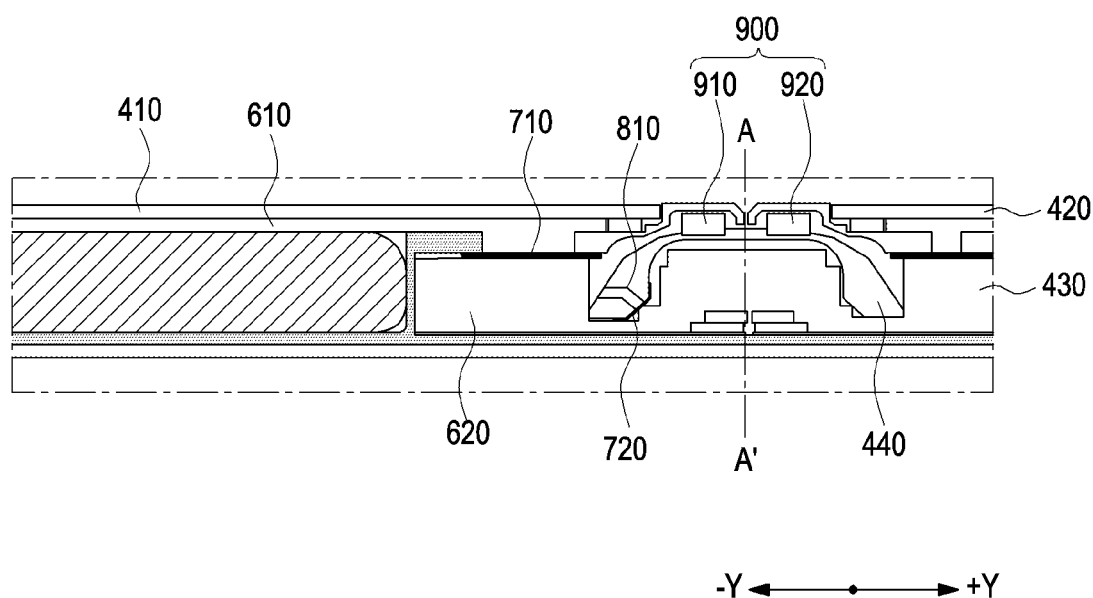
FIG. 9 is a cross-sectional view illustrating an electronic device taken along line B-B' in a second state (e.g., an unfolded state) of FIG. 2 according to various embodiments.

FIG. 9 is a cross-sectional view illustrating an electronic device 101 taken along line B-B' in a second state (e.g., an unfolded state) of FIG. 2 according to various embodiments.

Figure 10:
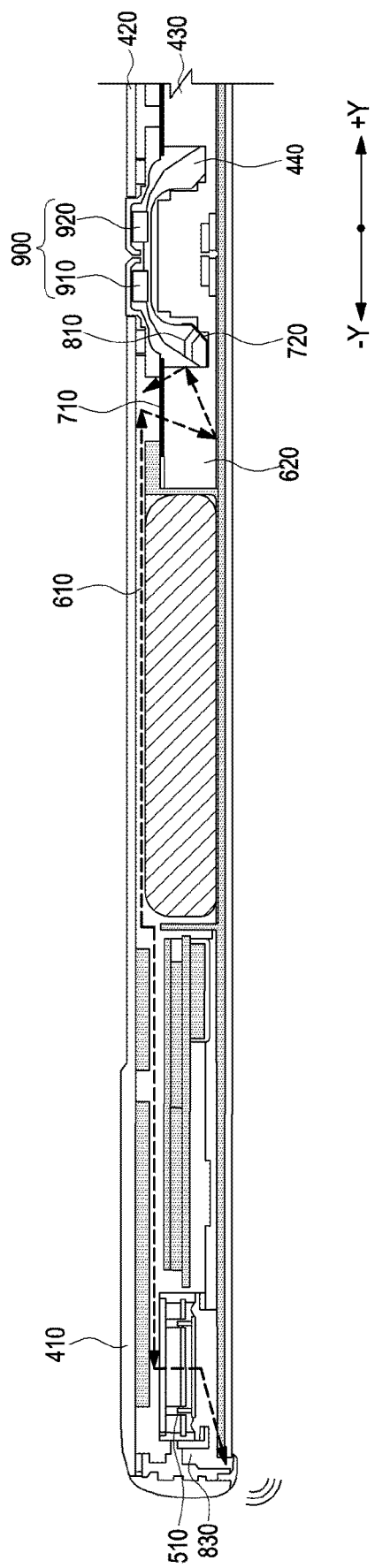
FIG. 10 is a cross-sectional view illustrating an electronic device taken along line B-B' in a second state (e.g., an unfolded state) of FIG. 2 and illustrating a movement route of the sound discharged through a first speaker module when the electronic device is in the second state (e.g., the unfolded state) according to various embodiments.

FIG. 10 is a cross-sectional view illustrating an electronic device 101 taken along line B-B' in a second state (e.g., an unfolded state) of FIG. 2 and illustrating a movement route of the sound discharged through a first speaker module 510 when the electronic device 101 is in the second state (e.g., the unfolded state) according to various embodiments. Referring to FIG. 9 and FIG. 10, the electronic device 101 according to various embodiments may include a first housing 410, a second housing 420, a hinge structure 430, a hinge cover 440, a first area 610, a second area 620, a first member 710, a second member 720, a first through-hole 810, and a sealing member 900. The first housing 410, the second housing 420, the hinge structure 430, the hinge cover 440, the first area 610, the second area 620, the first member 710, the second member 720, the first through-hole 810, and the sealing member 900 in FIG. 9 and FIG. 10 may be partially or wholly the same as the configurations of the first housing 410, the second housing 420, the hinge structure 430, the hinge cover 440, the first area 610, the second area 620, the first member 710, the second member 720, the first through-hole 810, and the sealing member 900 in FIG. 5.

In FIG. 9 and FIG. 10, "Y" may refer, for example, to a longitudinal direction of the electronic device 101 in a second state. In addition, in an embodiment of the disclosure, "+Y" may refer, for example, to an upward direction of the electronic device 101, and "−Y" may refer, for example, to a downward direction of the electronic device 101.

According to various embodiments, referring to FIG. 9, in a state in which the electronic device 101 is unfolded, a cover for the first housing 410 and the second housing 420 may form a substantially straight line, and the hinge cover 440 may be positioned in more inner side of the electronic device than the cover for the first housing 410 and the second housing 420. The first through-hole 810 provided to extend through the hinge cover 440 may be positioned in the electronic device 101 (e.g., in the hinge structure 430). Accordingly, the sound output from the first speaker module 510 may be transferred to the inside of the electronic device 101 via the hinge cover even when passing through the first through-hole 810, without being discharged to the outside.

According to various embodiments, the sealing member 900 may include a first sealing member 910 which is attached to the first housing 410 and disposed between the first housing 410 and the hinge cover 440, and a second sealing member 920 which is attached to the second housing 420 and disposed between the second housing 420 and the hinge cover 440. The first sealing member 910 and the second sealing member 920 may be selectively come into contact with the hinge cover 440 according to the rotation of the first housing 410 or the second housing 420. In addition, when the electronic device 101 is in the second state, at least a portion of the first sealing member 910 and the second sealing member 920 may come into contact therewith at a folding axis A portion. Accordingly, when the electronic device 101 is in the second state, the sound is prevented/reduced from leaking outside the electronic device 101 via the second area 620. In addition, it may perform a waterproof and dustproof function to block a foreign material which has entered the inside of the electronic device 101 from entering the inside. The sealing member 900 may include, for example, polyurethane foam.

According to various embodiments, one end of the first sealing member 910 may be attached to an end of the cover of the first housing 410 in the folding axis A direction and the other end thereof may have a linear shape provided in the folding axis A direction. In addition, one end of the second sealing member 920 may be attached to an end of the cover of the second housing 420 in the folding axis A direction and the other end thereof may have a linear shape provided in the folding axis A direction.

According to various embodiments, referring to FIG. 10, the movement route of the sound when the electronic device 101 is in the second state may be as follows. The sound output from the first speaker module 510 may be discharged in the downward direction (the −Y direction) of the electronic device 101 via the third through-hole 830 connected to the first speaker module 510. Referring to FIG. 5, the sound output from the second speaker module 520 may be discharged in the upward direction (the +Y direction) of the electronic device 101 via the second through-hole 820 connected to the second speaker module 520. In addition, as the first through-hole 810 is positioned in the electronic device 101, the sound output from the first speaker module 510 may not be discharged to the outside of the electronic device 101 via the hinge cover 440 and may be only discharged via the third through-hole 830 even when passing through the first area 610, the first member 710, the second area 620, the second member 720, and the first through-hole 810. Accordingly, since the sound is not leaked through the first through-hole 810 and the sound is discharged in the upward direction (the +Y direction) and in the downward direction (the −Y direction) of the electronic device 101, the electronic device 101 may have a stereo sound effect in the second state.

According to various embodiments, when the electronic device 101 is in the second state, as the space in which the first speaker module 510 can resonate expands to the first area 610 and the second area 620, the volume of the sound may increase. For example, when the first area 610 of about 9 cc and the second area 620 of 1.33 cc are combined, it is about 10.33 cc, so that a space increased by about 14% to 16% can be configured as a resonance space. For example, a space increased by about 15% may be configured as a resonance space. Therefore, when the electronic device 101 is in the second state, the volume of the sound, which is a basic performance of a speaker, may increase.

Figure 11A:
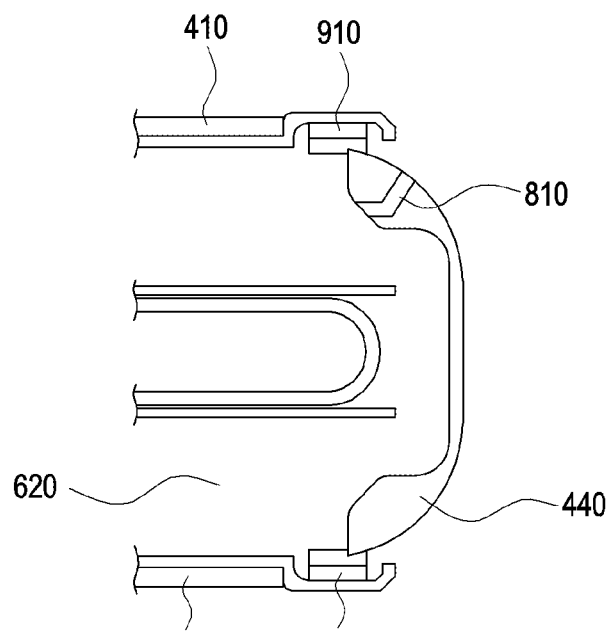
FIG. 11A is a cross-sectional view (a) illustrating a position relationship of a hinge cover and a first through-hole when an electronic device is in a first state, together with a diagram (b) illustrating the electronic device according to various embodiments.
Figure 11A:
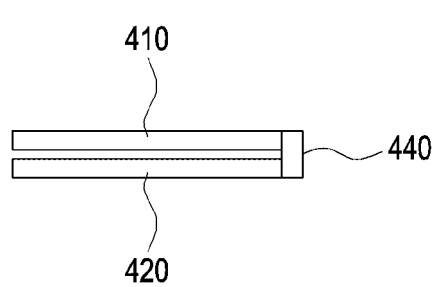
Figure 11B:
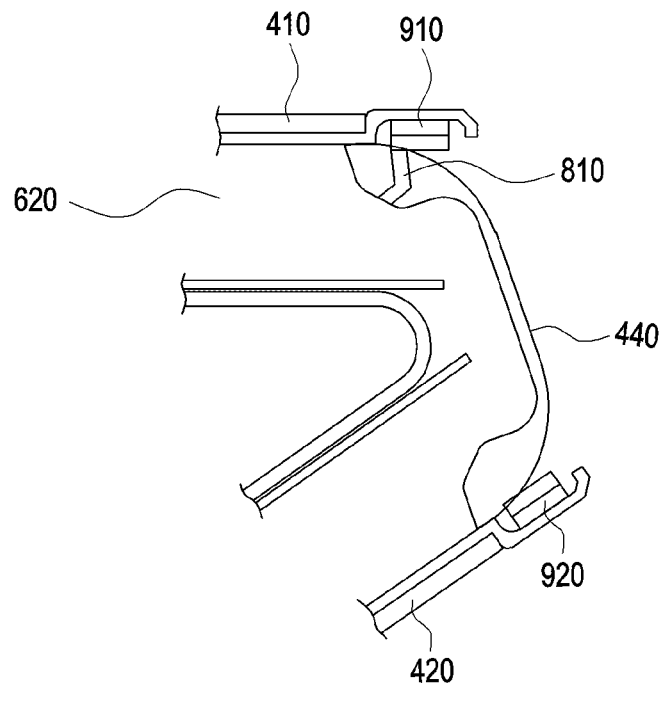
FIG. 11B is a cross-sectional view (a) illustrating a position relationship of a hinge cover and a first through-hole when a terminal angle of an electronic device is a second angle, together with a diagram (b) illustrating the electronic device according to various embodiments.
Figure 11B:
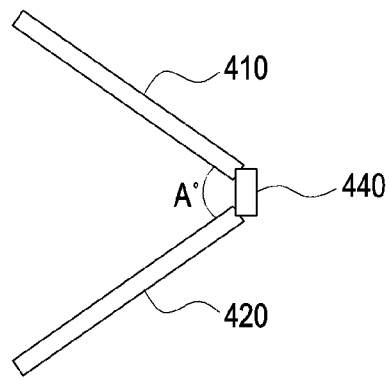
Figure 11C:
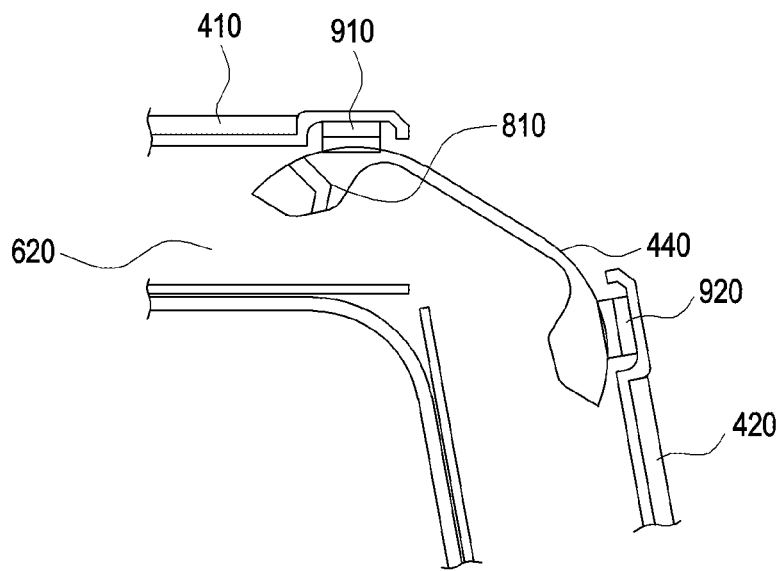
FIG. 11C is a cross-sectional view (a) illustrating a position relationship of a hinge cover and a first through-hole when an electronic device is in a second state, together with a diagram (b) illustrating an electronic device according to various embodiments.
Figure 11C:
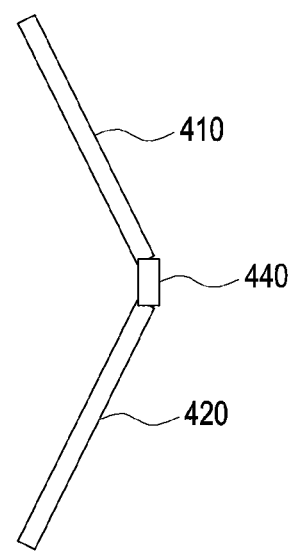

FIG. 11A is a cross-sectional view (a) illustrating a position relationship of a hinge cover and a first through-hole when an electronic device is in a first state, together with a diagram (b) illustrating the electronic device according to various embodiments. FIG. 11B is a cross-sectional view (a) illustrating a position relationship of a hinge cover and a first through-hole when a terminal angle of an electronic device is a second angle, together with a diagram (b) illustrating the electronic device according to various embodiments. FIG. 11C is a cross-sectional view (a) illustrating a position relationship of a hinge cover and a first through-hole when an electronic device is in a second state, together with a diagram (b) illustrating an electronic device according to various embodiments.

Referring to FIG. 11A, FIG. 11B, and FIG. 11C, the electronic device 101 according to various embodiments may include a first housing 410, a second housing 420, a hinge cover 440, a second area 620, a first through-hole 810, a first sealing member 910, and a second sealing member 920. The first housing 410, the second housing 420, the hinge cover 440, the second area 620, the first through-hole 810, the first sealing member 910, and the second sealing member 920 in FIG. 11A, FIG. 11B, and FIG. 11C may be partially or wholly the same as the configurations of the first housing 410, the second housing 420, the hinge cover 440, the second area 620, the first through-hole 810, the first sealing member 910, and the second sealing member 920 in FIG. 5.

According to various embodiments, referring to FIG. 11A, when the electronic device 101 is in the first state, an angle formed by the first housing 410 and the second housing 420 with respect to the folding axis may be more than or equal to a first angle and less than a second angle. The first angle may be 0 degrees and the second angle may be A° to be described later. In this case, the hinge cover 440 may be exposed to the outside of the electronic device 101 and the first through-hole 810 extending through one end of the hinge cover 440 may be also exposed to the outside.

According to various embodiments, referring to FIG. 11B, the angle formed by the first housing 410 and the second housing 420 of the electronic device 101 with respect to the folding axis may be the second angle A°. According to various embodiments, the second angle A° may be at least a part of the second state, may be an angle of a point at which transition from the first state to the second state starts.

In this case, at least a portion of the hinge cover 440 may be positioned inside the electronic device 101. In addition, the first through-hole 810 may be disposed to be perpendicular (90 degrees) to the rear cover part of the first housing 410. Accordingly, the sound output from the first speaker module 510 may be transferred into the electronic device 101 through the first through-hole 810 to be prevented/reduced from being discharged to the outside.

According to various embodiments, referring to FIG. 11C, when the electronic device 101 is in the second state, the angle formed by the first housing 410 and the second housing 420 with respect to the folding axis may be more than or equal to the second angle and less than or equal to a third angle. For example, the second angle may be A° and the third angle may be 180 degrees. In this case, at least a portion of the hinge cover 440 may be positioned inside the electronic device 101. The first through-hole 810 may be positioned in the electronic device 101. Accordingly, the sound output from the first speaker module 510 may be transferred into the electronic device 101 through the first through-hole 810 to be prevented/reduced from being discharged to the outside.

Figure 12:
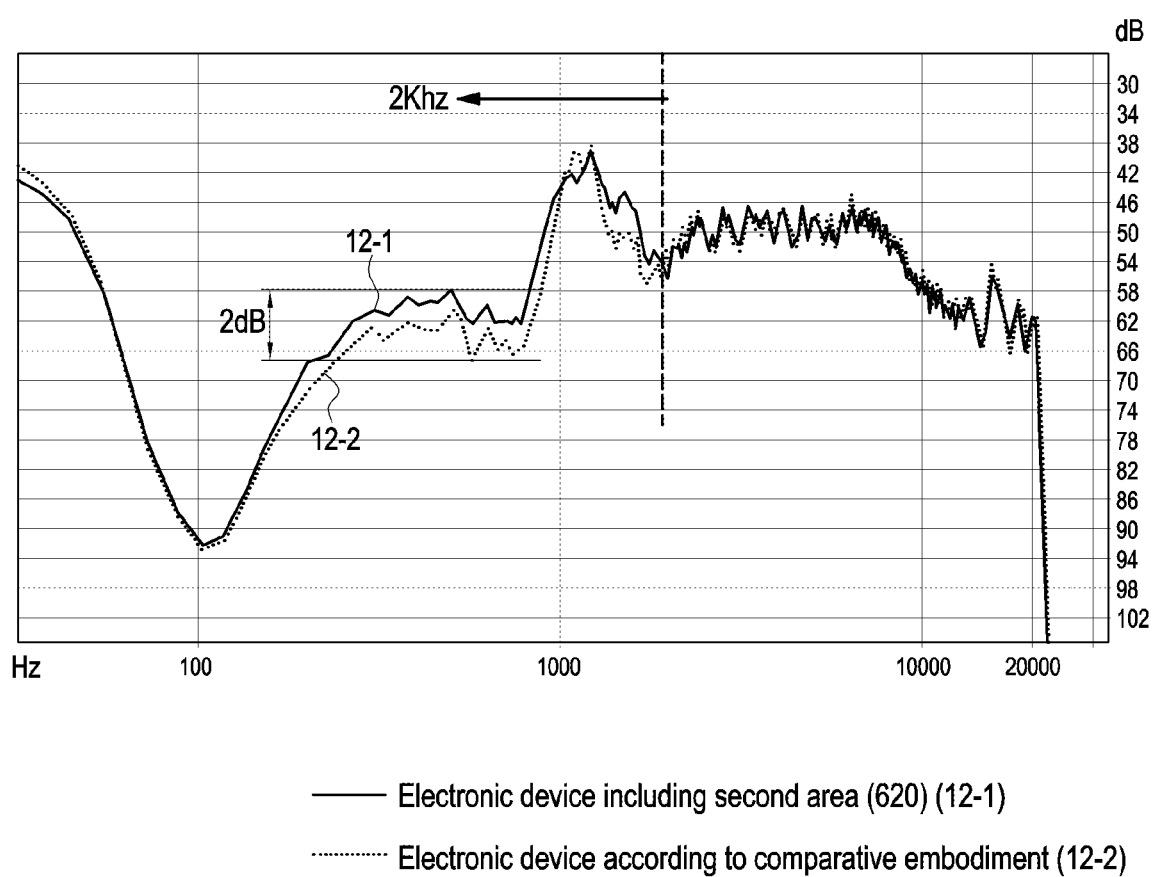
FIG. 12 is a graph showing sound volume for each frequency according to a second area when an electronic device is in a second state according to various embodiments.

FIG. 12 is a graph showing sound volume for each frequency according to a second area (e.g., the second area 620 in FIG. 5) when an electronic device (e.g., the electronic device 101 in FIG. 1) is in a second state according to various embodiments.

Referring to FIG. 12, a change in the sound volume according to the electronic device including the second area may be confirmed. In the graph of FIG. 12, the horizontal axis represents the frequency band (Hz) and the vertical axis represents the sound volume (RMS power) (dB). In the graph of FIG. 12, a solid line graph 12-1 represents the electronic device including the second area 620, and a dotted line graph 12-2 represents the electronic device according to a comparative embodiment. The configuration of the electronic device in FIG. 8 is applicable to that of the electronic device including the second area in FIG. 12.

According to various embodiments, it may be confirmed that the sound volume of the electronic device including the second area has a sound improvement effect in the middle and low frequencies of 2 kHz or less, when compared with the electronic device not including the second area.

Figure 13:
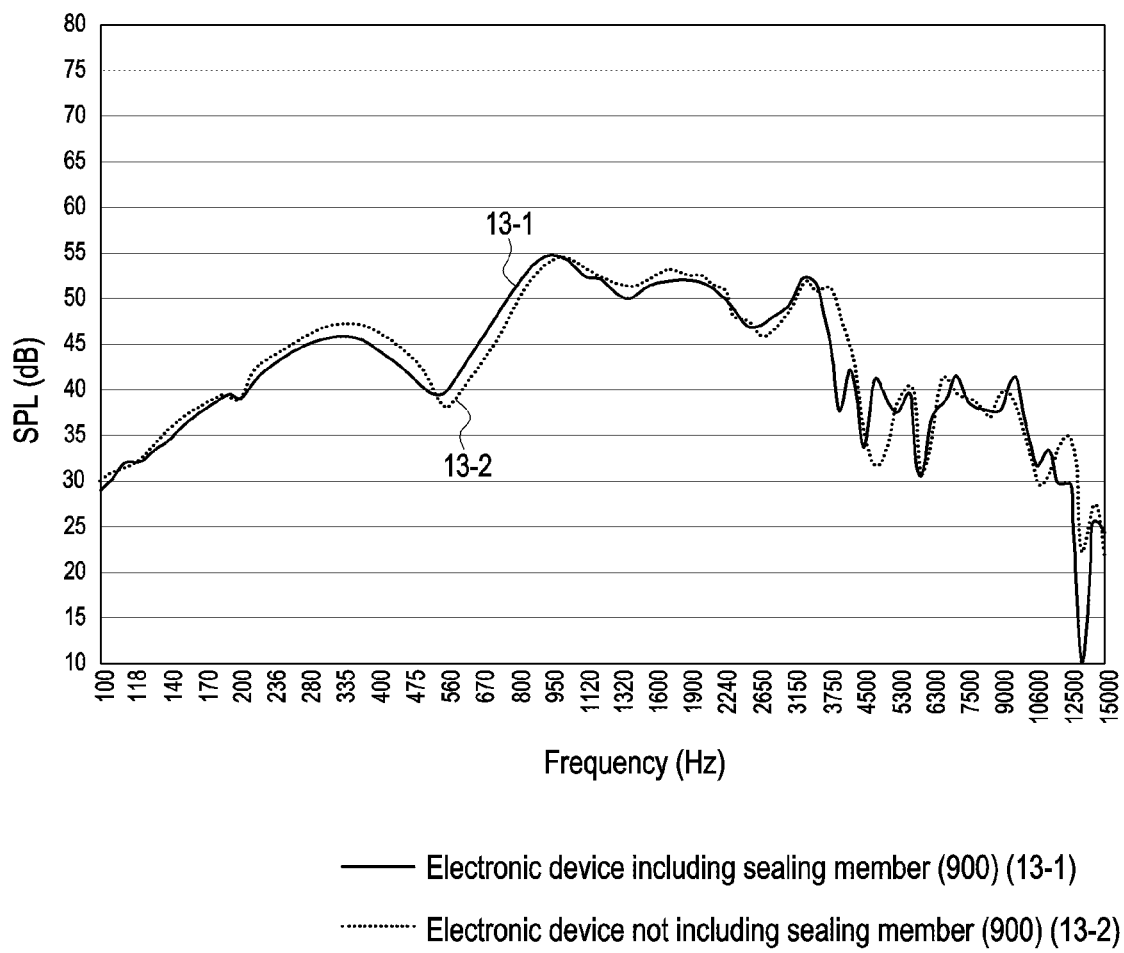
FIG. 13 is a graph showing sound volume for each frequency according to a sealing member when an electronic device is in a second state according to various embodiments.

FIG. 13 is a graph showing sound volume for each frequency according to a sealing member (e.g., the sealing member 900 in FIG. 5) when an electronic device (e.g., the electronic device 101 in FIG. 1) is in a second state according to various embodiments.

Referring to FIG. 13, a change in the sound volume according to the electronic device including the sealing member may be confirmed. In the graph of FIG. 13, the horizontal axis represents the frequency band (Hz), and the vertical axis represents the sound pressure level (dB). In the graph of FIG. 13, a solid line graph 13-1 represents the electronic device including the sealing member, and a dotted line graph 13-2 represents the electronic device not including the sealing member. The configuration of the electronic device in FIG. 7 is applicable to that of the electronic device including the sealing member in FIG. 13.

According to an embodiment, when compared with the electronic device not including the sealing member, it may be confirmed that the electronic device including the sealing member has the sound pressure level similar thereto. Accordingly, it may be confirmed that a sound leakage phenomenon does not occur according to the second area (e.g., the second area 620 in FIG. 5) due to the sealing member when the electronic device is in the second state.

An electronic device (e.g., the electronic device in FIG. 1) according to various example embodiments may include: a first housing (e.g., the first housing 410 in FIG. 5), a second housing (e.g., the second housing 420 in FIG. 5) configured to be unfolded by a specified angle with respect to the first housing and rotate about a folding axis, at least one hinge structure including a hinge (e.g., the hinge structure 430 in FIG. 5) providing the folding axis and disposed between the first housing and the second housing to rotatably connect the first housing and the second housing, a hinge cover (e.g., the hinge cover 440 in FIG. 5) accommodating at least a portion of the hinge structure therein and selectively exposed based on the rotation of the second housing, a first speaker module including a speaker (e.g., the first speaker module 510 in FIG. 5) accommodated in the first housing, and a second speaker module including a speaker (e.g., the second speaker module 510 in FIG. 5) accommodated in the second housing, wherein with respect to the folding axis, the first housing and second housing include a first state of being unfolded by less than a reference angle and a second state of being unfolded by at least the reference angle, and in the first state, the first speaker module is configured to discharge sound to the outside of the electronic device via a first area (e.g., the first area 610 in FIG. 5) provided in the first housing, a second area (e.g., the second area 620 in FIG. 5) provided in the hinge structure and is in contact with the first area, and a first through-hole (e.g., the first through-hole 810 in FIG. 5) extending through the hinge cover, exposed to the outside in the first state, and is configured to be selectively closed based on the rotation of the second housing.

According to various example embodiments, the first through-hole may have a shape bent by a specified angle.

According to various example embodiments, a first member comprising a sheet (e.g., the first member 710 in FIG. 5) disposed between the first area and the second area may be further included.

According to various example embodiments, a second member (e.g., the second member 720 in FIG. 5) comprising a sheet disposed on at least one surface of the hinge cover and at least a portion of which is in contact with the first through-hole may be further included.

According to various example embodiments, the first area and the second area may include a space in which the sound output from the first speaker module can resonate.

According to various example embodiments, the electronic device may be designed to increase volume of sound as a space in which the sound output from the first speaker module can resonate expands to the first area and the second area in the second state.

According to various example embodiments, the second area may include an empty space other than the first area.

According to various example embodiments, a third through-hole disposed adjacent to the first speaker module and configured to guide the sound generated from the first speaker module to be radiated to the outside may be further included.

According to various example embodiments, a second through-hole disposed adjacent to the second speaker module and configured to guide the sound generated from the second speaker module to be radiated to the outside may be further included.

According to various example embodiments, in the first state, the sound output from the first speaker module may be discharged to the outside of the electronic device through the first through-hole and the sound output from the second speaker module may be discharged to the outside of the electronic device through the second through-hole to provide a stereo sound.

According to various example embodiments, in the second state, the sound output from the first speaker module may be discharged to the outside of the electronic device through the third through-hole and the sound output from the second speaker module may be discharged to the outside of the electronic device through the second through-hole so as to provide a stereo sound.

According to various example embodiments, the sound output from the first speaker module may be transferred into the electronic device when passing through the first through-hole. According to various example embodiments, the reference angle may comprise a second angle, the first state includes a folded state in which the first housing and the second housing face each other and is a state of being unfolded by at least first angle and less than second angle with respect to the folding axis, and the second state is a state in which the first housing and the second housing are unfolded by at least second angle and up to third angle with respect to the folding axis.

According to various example embodiments, based on the second housing being rotated by the second angle with respect to the first housing, the first through-hole may be disposed to be perpendicular to a rear cover part of the first housing, and in the first state, the first through-hole may be exposed to the outside of the electronic device, and in the second state, the first through-hole may be accommodated inside the electronic device.

An electronic device (e.g., the electronic device in FIG. 1) according to various example embodiments may include: a first housing (e.g., the first housing 410 in FIG. 4), a second housing (e.g., the second housing 420 in FIG. 4) configured to be unfolded by a specified angle with respect to the first housing and rotate about a folding axis, at least one hinge structure comprising a hinge (e.g., the hinge structure 430 in FIG. 4) providing the folding axis and disposed between the first housing and the second housing to rotatably connect the first housing and the second housing, a hinge cover (e.g., the hinge cover 440 in FIG. 4) accommodating at least a portion of the hinge structure therein and is selectively exposed based on the rotation of the second housing, a first seal (e.g., the first sealing member 910 in FIG. 4) attached to the first housing and disposed between the first housing and the hinge cover, and a second seal (e.g., the second sealing member 920 in FIG. 4) attached to the second housing and disposed between the second housing and the hinge cover, wherein with respect to the folding axis, the first housing and second housing include a first state of being unfolded by less than a reference angle and a second state of being unfolded by at least the reference angle.

According to various example embodiments, the first seal or the second seal may be configured to selectively come into contact with the hinge cover based on the rotation of the first housing or the second housing.

According to various example embodiments, one end of the first seal may be attached to an end of the first housing and the other end thereof may have a linear shape provided in the folding axis direction, and one end of the second seal may be attached to an end of the second housing and the other end thereof may have a linear shape provided in the folding axis direction.

According to various example embodiments, in the second state, at least a portion of the first seal and the second seal may be in contact therewith at the folding axis portion.

According to various example embodiments, the first seal or the second seal may include a polyurethane foam.

According to various example embodiments, in the second state, the first seal or the second seal may block the sound output from the first speaker module from being leaked to the outside of the electronic device via a second area and may block a foreign material from entering the inside from the outside of the electronic device.

It may be apparent to a person ordinarily skilled in the technical field to which the disclosure belongs that the above-described electronic device including a speaker module according to various embodiments of the disclosure is not limited by the above-described embodiments and drawings, and can be variously substituted, modified, and changed within the technical scope of the disclosure.

What is claimed is:

1. An electronic device comprising:
a first housing;
a second housing configured to be unfolded by a specified angle with respect to the first housing and rotate about a folding axis;
at least one hinge structure, including a hinge, configured for providing the folding axis and disposed between at least the first housing and the second housing to rotatably connect the first housing and the second housing;
a hinge cover accommodating at least a portion of the hinge structure therein and configured to be selectively exposed based on the rotation of the second housing; and
a first speaker module including a speaker accommodated in the first housing,
wherein in a first state where the first housing and the second housing are unfolded by less than a reference angle with respect to the folding axis, the first speaker module is configured to discharge sound to an outside of the electronic device via a first area, a second area, and a first through-hole,
wherein the first area is provided in the first housing,
wherein the second area is provided inside the hinge cover and connected with the first area, and
wherein the first through-hole extends through the hinge cover, is configured to be exposed to the outside in the first state, and is configured to be selectively closed based on the rotation of the second housing.

2. The electronic device of claim 1, wherein the first through-hole has a shape bent by a specified angle.

3. The electronic device of claim 1, further comprising: a first member comprising a sheet disposed between the first area and the second area.

4. The electronic device of claim 1, further comprising: a second member comprising a sheet disposed on at least one surface of the hinge cover and at least a portion of which is in contact with the first through-hole.

5. The electronic device of claim 1, wherein the first area and the second area include spaces in which the sound output from the first speaker module can resonate.

6. The electronic device of claim 1, wherein in a second state where the first housing and the second housing are unfolded by at least the reference angle with respect to the folding axis, the electronic device is configured to increase volume of sound as a space in which the sound output from the first speaker module can resonate expands to the first area and the second area.

7. The electronic device of claim 6, further comprising: a third through-hole disposed adjacent to the first speaker module and configured to guide the sound generated from the first speaker module to be radiated to the outside.

8. The electronic device of claim 7, further comprising:
a second speaker module including a speaker accommodated in the second housing; and
a second through-hole which is disposed adjacent to the second speaker module and configured to guide the sound generated from the second speaker module to be radiated to the outside.

9. The electronic device of claim 8, wherein in the first state,
the sound output from the first speaker module is configured to be discharged to the outside of the electronic device through the first through-hole and
the sound output from the second speaker module is configured to be discharged to the outside of the electronic device through the second through-hole to provide a stereo sound.

10. The electronic device of claim 8, wherein in the second state
the sound output from the first speaker module is configured to be discharged to the outside of the electronic device through the third through-hole and
the sound output from the second speaker module is configured to be discharged to the outside of the electronic device through the second through-hole to provide a stereo sound.

11. The electronic device of claim 10, wherein the sound output from the first speaker module is configured to be transferred into the electronic device when passing through the first through-hole.

12. The electronic device of claim 6, wherein the reference angle is a second angle,
in the first state, the first housing and the second housing face each other and are unfolded by at least a first angle and less than the second angle with respect to the folding axis, and
in the second state, the first housing and the second housing are unfolded by at least the second angle and at most a third angle with respect to the folding axis.

13. The electronic device of claim 12, wherein based on the second housing being rotated by the second angle with respect to the first housing, the first through-hole is disposed to be perpendicular to a rear cover part of the first housing,
in the first state, the first through-hole is exposed to the outside of the electronic device, and
in the second state, the first through-hole is accommodated inside the electronic device.

14. The electronic device of claim 1, wherein the second area includes an empty space other than the first area.

15. The electronic device of claim 1, further comprising:
a first seal attached to the first housing and disposed between at least the first housing and the hinge cover; and
a second seal attached to the second housing and disposed between at least the second housing and the hinge cover,
wherein, in the first state, the through-hole is open and exposed to outside of the electronic device, and
wherein, in the second state, the through-hole is sealed by the first seal.

16. The electronic device of claim 15, wherein the first seal and the second seal are configured to selectively come into contact with the hinge cover based on the rotation of the first housing or the second housing.

17. The electronic device of claim 15, wherein one end of the first seal is attached to an end of the first housing and the other end thereof has a linear shape provided in a direction of the folding axis, and
one end of the second seal is attached to an end of the second housing and the other end thereof has a linear shape provided in the direction of the folding axis.

18. The electronic device of claim 15, wherein in the second state, at least portions of the first seal and the second seal are configured to make contact with the hinge cover.

19. The electronic device of claim 15, wherein the first seal or the second seal comprises polyurethane foam.

20. The electronic device of claim 15, wherein in the second state, the first seal or the second seal is configured to block sound output from the first speaker module from being leaked to the outside of the electronic device via the second area and to block a foreign material from entering inside the electronic device from the outside.

\* \* \* \* \*